United States Patent [19]
Bridge

[11] 3,837,028
[45] Sept. 24, 1974

[54] FLOOR TREATING MACHINES

[75] Inventor: Samuel Douglas Bridge, Wiltshire, England

[73] Assignee: R. G. Dixon & Company, Limited, Wembley, Middlesex, England

[22] Filed: Sept. 22, 1972

[21] Appl. No.: 291,427

[30] Foreign Application Priority Data
Sept. 23, 1971 Great Britain.................... 44486/71

[52] U.S. Cl...................... 15/50 R, 15/98, 15/320, 180/6.5
[51] Int. Cl......................... A47l 11/16, B62d 11/04
[58] Field of Search .................. 180/6.5, 2; 46/210; 15/50 R, 98, 320

[56] References Cited
UNITED STATES PATENTS

| | | | |
|---|---|---|---|
| 2,162,954 | 6/1939 | Lenhart | 180/6.5 |
| 2,244,528 | 6/1941 | Schur | 180/6.5 UX |
| 2,586,239 | 2/1952 | MacKenzie | 46/210 X |
| 2,798,565 | 7/1957 | Rosenthal | 180/6.5 |
| 3,402,505 | 9/1968 | Nakamura | 46/210 X |

Primary Examiner—David Schonberg
Assistant Examiner—John A. Pekar
Attorney, Agent, or Firm—Barlow & Barlow

[57] ABSTRACT

An electrically powered floor-treating machine having at least one drivable floor-engaging wheel and a remote control panel connected to the machine and adapted to be operated by an operator walking along with the machine and having facilities for controlling the steering and application of power to the drivable wheel or wheels.

1 Claim, 6 Drawing Figures

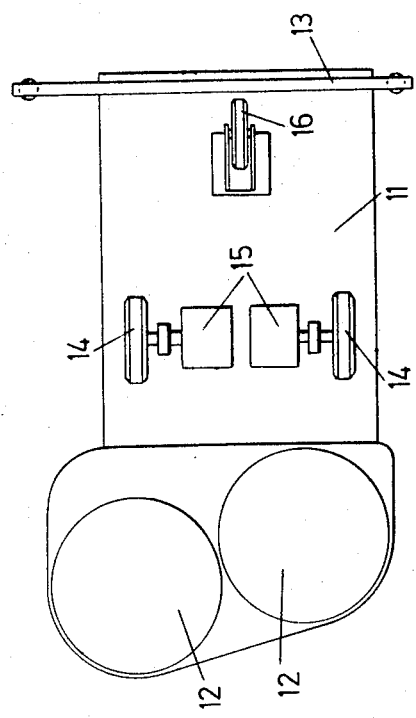
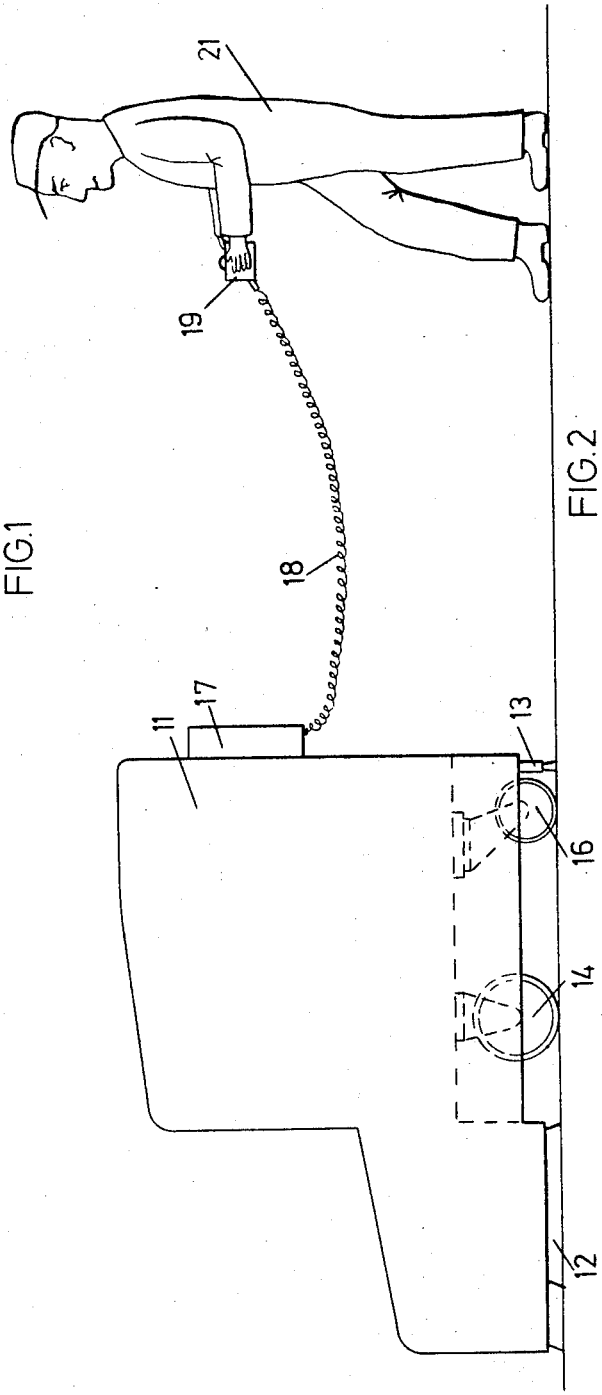

FLOOR TREATING MACHINES

This invention relates to floor treating machines.

Many types of industrial, i.e., large scale, floor treating machines are of considerable weight and bulk so that they have to be power driven for movement as well as operation. In addition it is frequently difficult for an operator to see the floor immediately in front of the machine from the control position at the machine handle. This difficulty applies particularly with battery powered machines, e.g. for scrubbing and drying floors, as such machines may well be about 4 feet long and over 3 feet high.

According to the invention, there is provided an electrically powered floor-treating machine having at least one drivable floor engaging wheel and a remote control panel connected to the machine and adapted to be operated by an operator walking along with the machine and having facilities for controlling the steering and application of power to the drivable wheel or wheels.

Preferably, the remote control panel provides for at least control of forward and reverse motion of the drivable wheels, and the steering may be obtained by differential application of drive to the drivable wheels on opposite sides of the machine.

It will be appreciated that the invention is particularly applicable for battery powered machines, where the weight and bulk of the batteries increases the size of the machine, but it is also applicable to mains power operated machines which can also be improved by having remote control.

In order to reduce the number of switches on the remote control unit, and hence the complexity of the connection to the machine, the machine may carry speed setting switches and controls so that only on/off switches for the motive power of the machine are required on the remote control panel.

The arrangement is preferably such that the operator can carry the remote control panel while walking to one side of or slightly ahead of the machine so that he or she can see the floor immediately in front of the machine and ensure that the cleaning performance is adequately concentrated. There should also be sufficient length of connection to enable the operator to drop slightly behind the machine to check the area just cleaned in case a second run is required over particular areas.

In a particularly advantageous arrangement, the machine has a pair of drivable wheels each drivable by a separate battery driven motor, the motors being separately controllable from the remote control panel. Thus both steering and motive power control could be achieved from a remote control panel giving forward and reverse on/off switches for each motor. The forward speed setting would be by a separate switch so that different speeds could be selected before switching the motors on. Only a single slow reverse speed would normally be provided. This system can then readily be adapted to remote control by having a box with four spring loaded buttons on a panel which, so that on pressing the first two down, one with the thumb of the left hand and the other with the thumb of the right hand, drive in the forward direction at the previously selected speed would be achieved.

To drive in the rear direction the two back buttons would be pressed by the thumb and to steer various combinations of the buttons can be used.

The button on the remote control box would preferable be spring loaded to switch off to stop the machine if the operator happened to drop the box or release the buttons and thus lose touch with the machine.

The invention will be further described with reference to the accompanying drawings, which illustrate various embodiments of the invention.

In the drawings:

FIG. 1 is a diagrammatic bottom plan view of a floor cleaning machine adapted for use with a preferred embodiment of the invention;

FIG. 2 is a side elevation of the machine of FIG. 1, including an operator and a control device;

Figure 3:
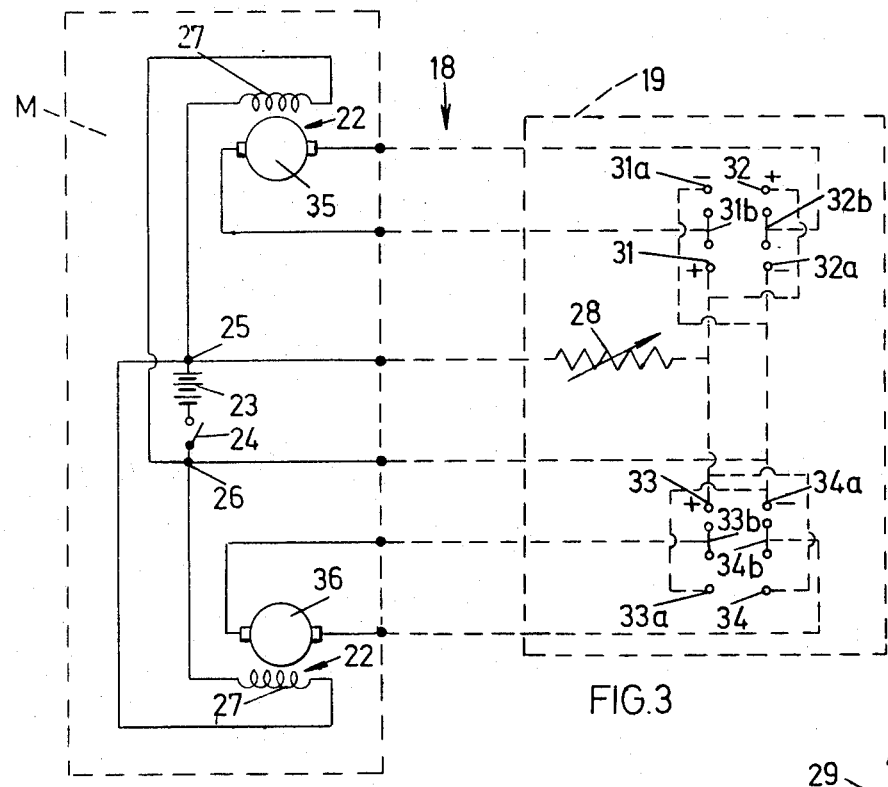
FIG. 3 is a circuit diagram of one form of the invention.

The machine shown in FIG. 1 includes a body 11 incorporating tanks for cleaning liquids and also batteries to form the power source for operating and moving the machine. A pair of brushes 12 are mounted at the forward end of the machine and a suction nozzle 13 at the rear. Below the body 11 are a pair of forward, driving wheels 14, each having a drive unit 15, and a single rear castor wheel 16.

FIG. 2 shows a control unit 17 mounted on the body 11 and connected by a flexible cable 18 with a remote control switching box 19 carried by an operator 21.

Figure 4:
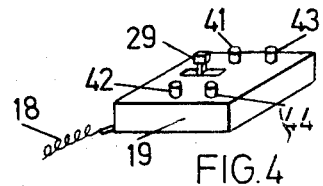
FIG. 4 shows an arrangement of buttons on a control box for the circuit of FIG. 3.
Figure 5:
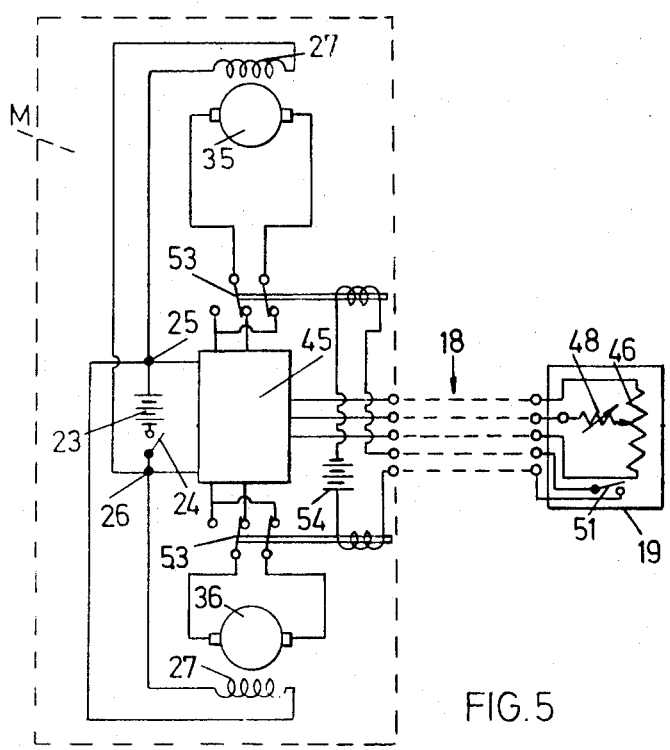
FIG. 5 is a circuit diagram of a second form of the invention.

In each of FIGS. 3 and 5, the circuitry within the box M is located on the machine. FIG. 3 shows a simple form of circuit for driving and controlling a pair of motors 22 for the wheels of the machine. A battery 23 and switch 24 are connected between terminals 25 and 26. Field windings 27 for the motors 22 are connected across the terminals 25 and 26. Terminal 25 is connected via a conductor in the cable 18 and a variable resistor 28, controlling by a slider 29 (FIG. 4), to switch contacts 31, 32, 33 and 34. Terminal 26 is connected by a conductor in cable 18 to switch contacts 31a, 32a, 33a and 34a. The armature 35 and 36 of motors 22 are connected between further switch contacts 31b and 32b, and 33b and 34b respectively.

Push buttons 41, 42, 43 and 44 on the box 19 are spring-loaded to off position and are adapted to be pressed by the operators thumbs to provide forward and reverse operation of the motors 22. Specifically, button 41 connects contacts 31 with 31b and 32a with 32b for motion of armature 35 in forward direction. Button 43 connects contacts 31a and 32 respectively with contacts 31b and 32b for reverse motion of armatures 35. Button 42 connects contacts 33 and 34a respectively with contacts 33b and 34b for forward motion armature 36; and button 44 connects contacts 33a and 34 respectively with contacts 33b and 34b for reverse motion of armature 36. Slider 29 sets the speed of the armature. Normal forward motion of the machine is obtained by simultaneously operation of buttons 41 and 42, and steering by operating one rather than the other. Buttons 43 and 44 supply similar control for reverse motion.

Figure 6:
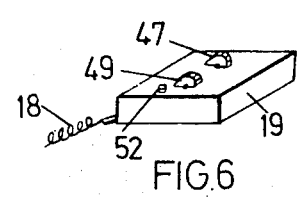
FIG. 6 shows an arrangement of controls on a control box for the circuit of FIG. 5.

In the arrangement of FIGS. 5 and 6, the field windings are fed as in FIG. 3, but the mainccontrol of the motor current is by a thyristor control unit 45, which has two pairs of outputs, one for each armature. The vent 45 is connected via a conductor in the cable 18 to a variable potentiometer 46 operated by a thumb wheel 47 (FIG. 6). A tapping of the potentiometer 46 passes via a variable resistor 48, operated by a thumb wheel 49, back to the unit 45. Adjustment of resistor 48 leads to simultaneous variation of the output voltages with corresponding speed adjustment of both rotors, while adjustment of potentiometer 46 leads to adjustment of the relative speeds of the motors, and hence is a steering control. A reversing switch 51 is provided, operated by a push button 56 on the remote control box. This switch 51 controls a relay circuit for changeover contacts 53 between the outputs of the unit 45 and the armatures. The relay circuit is shown as having a separate battery 54, but it could be operated from the main battery 23 is required.

Various modifications may be made within the scope of the invention. Thus, where a separate steering control is required, a power steering motor may be controlled by a pair of buttons or a rocker on the control panel controlling two on/off switches for the two directions of motion of the steering motor.

I claim:

1. In an electrically powered floor treating machine for scrubbing floors including a scrubbing wheel for engaging the floor, the improvement which comprises the combination of a body, at least three wheels rotatably mounted on said body, a battery supplying d.c. power, two d.c. motors carried by said body each having an armature, current control means in series with each of said armatures and said battery for separate control of the current supplied to said armatures, relay means for controlling the direction of current flow through said armatures, means individually connecting the rotative output of said motors to two of said wheels, a third of said wheels being freely rotatable on an axis and swivelly mounted on said body, portable controlling means distant from said body and connected to said body by electric cables for controlling the current control means, said controlling means comprising a control panel having two thumb wheels and a pushbutton switch, said switch controlling said relay means whereby the current flow in both armatures is reversed, one of said thumb wheels actuating a first variable component for varying both current control means simultaneously, the other thumb wheel actuating a second variable component for altering the balance between the current control means, the said electric cables operatively connecting the reversing switch means to the relay and the variable components to the current control means.

* * * * *